J. E. KEPPEL.
GAGE.
APPLICATION FILED NOV. 24, 1915.
1,229,289.
Patented June 12, 1917.
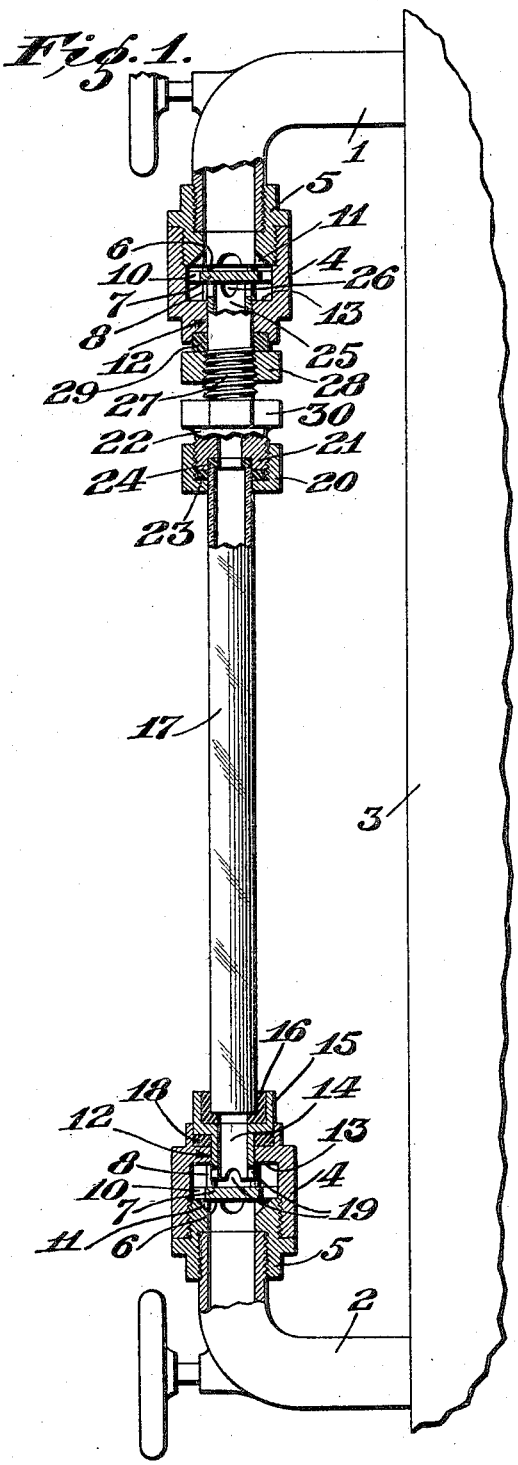
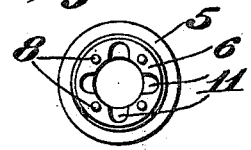
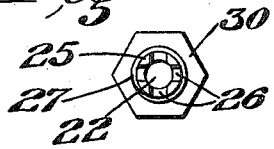
Inventor:
Jesse E. Keppel,
By Bruce S. Elliott
his Atty.

UNITED STATES PATENT OFFICE.

JESSE E. KEPPEL, OF ST. LOUIS, MISSOURI.

GAGE.

1,229,289.  Specification of Letters Patent.  Patented June 12, 1917.

Application filed November 24, 1915. Serial No. 63,193.

*To all whom it may concern:*

Be it known that I, JESSE E. KEPPEL, a citizen of the United States residing in the city of St. Louis and State of Missouri, have invented new and useful Improvements in Gages, of which the following is a specification.

This invention relates to water level gages for steam boilers and the like, and more particularly to that class of gages which are provided with valves arranged and adapted to close automatically so as to prevent the escape of the water or steam in the event that the glass indicator tube becomes fractured. The principal objects of the invention are to simplify the construction of devices of this character; to produce a structure wherein the valves will respond quickly to shut off the flow of the water or steam; and to provide for readily assembling, taking down and replacing the parts.

In the accompanying drawing illustrating a practical embodiment of the invention,—

Figure 1 is a view of the gage, partly in side elevation and partly in vertical section;

Fig. 2 is a face view of the outer valve seat and guide;

Fig. 3 is a face view of the valve member; and

Fig. 4 is an end view of one of the valve-supporting members.

Referring now to the drawing, the numerals 1 and 2, respectively, indicate upper and lower branch pipes connected at their inner ends to the boiler 3 and having their outer ends turned toward each other and attached to valve casings 4. In the outer portions of the valve casings 4 are tubular screw-plugs 5 which afford the connections with said pipes 1 and 2 and have their inner ends arranged and adapted to afford seats 6 for valve-disks 7. Projecting from the faces of the valve seats 6 are pins 8 which are arranged and adapted to enter perforations 9 in said valve-disks 7 with a loose fit so as to afford guides for said valve-disks. The valve-disks 7 are further provided with marginal notches 10 which are caused to register with recesses 11 in the valve-seats 6 when said disks are brought into contact with said seats, thereby permitting the flow of the water or steam under normal conditions.

At the inner ends of the valve-casings 4 are circular openings 12 which are surrounded on the inside of the casings by flat valve-seats 13 with which said valve-disks 7 coöperate, in a manner hereinafter set forth, to prevent the escape of the water or steam should the glass gage tube become fractured. Fitted slidably in the opening 12 of the lower valve-casing is a tubular member 14 having an annular, recessed enlargement 15 at its outer end in which is placed a rubber or other suitable bushing 16 for effecting a tight joint with the lower end of the glass gage tube 17. This enlargement 15 is also designed to coöperate with a packing ring 18, preferably of rubber and seated in a recess in the end of the valve-casing, so as to make a normally tight joint about the member 14 which will prevent leakage of the water or steam. When the member 14 is in place, its inner end projects some distance beyond the valve-seat 13 and normally prevents the valve-disk 7 from coming into contact with said valve-seat, the end of said member 14 having notches 19 therein which permit the water or steam to flow freely through the gage under normal conditions.

The upper end portion of the gage glass 17 has a packing gland 20 thereon for attachment to the end portion 21 of a tubular coupling member 22, a packing ring 23 being provided in said gland for effecting a tight joint about the glass tube, and the coupling member having a fiber or suitable ring 24 in its end against which the end of the glass tube abuts, so as to prevent breakage of that portion of the tube and to afford a further seal against leakage of the water or steam. The coupling member 22 has a reduced portion 25 which projects, with a sliding fit, through the opening 12 of the upper valve-casing 4, so as to support the valve-disk 7 normally away from the seat 13, and it is provided with notches 26 in its end similar to the notches 19 of the member 14 described with reference to the valve-disk in the lower valve-casing, thereby permitting the water or steam to flow freely through the gage under normal conditions.

Outside of the valve-casing the coupling member 22 is provided with screw-threads 27 on which portion is fitted a jam nut 28, between which latter and the end of the valve-casing a packing ring 29, preferably of rubber or other suitable resilient material, is interposed for effecting a tight joint to prevent leakage about the portion 25 of the coupling member 22. Between the screw-threaded portion 27 and the end 21, the coupling member is provided with a hexagonal enlargement or collar 30, or some other suitable means for facilitating the application and manipulation of the coupling member.

In tightening the nut 28 against the packing ring 29, and the latter in turn against the end of the upper valve-casing, the tendency of the coupling member 22 is to move away from said upper valve-casing and toward the lower valve-casing. Consequently, the coupling member 22 is pressed tightly against the upper end of the gage glass 17, and the latter in turn with its lower end against the member 14 and packing ring 18, thereby securely holding the parts in their assembled relation and effectively sealing all of the joints so as to prevent leakage.

The assembling of the parts or taking down of the structure is quickly accomplished, for it is only necessary to move the jam nut 28 toward the hexagonal enlargement 30 so that a slight endwise movement, inward with respect to the valve-casing 4, may be imparted to the coupling member 22 after the packing gland 20 is first disengaged from said coupling member. The upper end of the glass tube 17 is then readily disengaged from the end of the coupling member by moving the tube so as to incline it out of alinement with said coupling member, after which the lower end of the tube is withdrawn from the member 14 or withdrawn from the valve-casing 4 with the member 14 still attached. In replacing the parts the operation is reversed. That is, the glass tube 17 with its coöperating member 14 is first engaged with the valve-casing 4. The upper end portion of the tube is next brought into alinement with the coupling member 22 and then the packing gland 20 is applied to said coupling member. It only remains to tighten the jam nut 28 to secure the parts in place.

Should the glass tube become fractured, the pressure behind the valve-disks 7 will force them to the seats 13 and thereby prevent the escape of the water or steam. The loose fitting of the members 14 and 25 in the openings 12 of the valve-casings, and the peculiar arrangement, form and qualities of the packings 18 and 29, offers no appreciable resistance to the pressure, but to the contrary permits, and in fact assists, the valves to close quickly. That is, the action of the packing rings upon being relieved of compression tends to move the members 14 and 25 out of the valve-casings.

The invention admits of considerable modification within its scope and spirit as defined by the appended claims, and it is, therefore, not limited to the precise construction and arrangement shown in the accompanying drawing.

I claim:

1. In a device of the class described, two opposed valve-casings, said valve-casings having alined openings in their meeting ends and valve-seats surrounding said openings, valve-members in said valve-casings arranged and adapted to coöperate with said valve-seats to shut off the flow from said valve-casings, tubular members fitted slidably in said alined openings of the valve-casings and projecting normally inward beyond said valve-seats so as to hold said valve-members away from said valve-seats and having openings arranged and adapted to permit flow from said valve-casings when in such relation, means for effecting self-releasable seals between said tubular members and the adjacent ends of said valve-casings, a gage tube having sealed connections at its ends with the outer ends of said tubular members, and a device movable on one of said tubular members longitudinally thereof and coöperating with the end of the valve-casing for holding the coöperating parts in normal assembled relation and making the said seals effective.

2. In a device of the class described, two opposed valve-casings, said valve-casings having alined openings in their meeting ends and valve-seats surrounding said openings, valve-members in said valve-casings arranged and adapted to coöperate with said valve-seats to shut off the flow from said valve-casings, a tubular member fitted slidably in the opening of one of said valve-casings and projecting normally inward beyond the valve-seat thereof so as to hold the valve-member away from said valve-seat and having openings arranged and adapted to permit flow from the valve-casing when in such relation, said tubular member having an annular enlargement at its outer end, and a releasable sealing ring surrounding said tubular member between said enlargement and the end of said valve-casing, a tubular member fitted slidably in the alined opening of said other valve-casing and being arranged, adapted and coöperating at its inner end with the valve-member in said valve-casing in a manner similar to said first-mentioned tubular member, a gage tube having sealed connections at its ends with the outer ends of said tubular members, and an annular member movable on said second-mentioned tubular member longitudinally thereof and coöperating with the end of the valve-casing with an interposed releasable sealing ring so as to hold the coöperating parts in normal assembled relation and making the said seals effective.

3. In a device of the class described, two opposed valve-casings, said valve-casings having alined openings in their meeting ends and valve-seats surrounding said openings, valve-members in said valve-casings arranged and adapted to coöperate with said valve-seats to shut off the flow from said valve-casings, a tubular member fitted slidably in the opening of one of said valve-casings and projecting normally inward beyond the valve-seat thereof so as to hold the valve-member away from said valve-seat and having openings arranged and adapted to permit flow from said valve-casing when in such relation, said tubular member having an annular enlargement at its outer end, a releasable sealing ring between said enlargement and the end of said valve-casing, said tubular member having a recess in its outer end, and a packing bushing in said recess, a tubular member fitted slidably in the alined opening of said other valve-casing and being arranged, adapted and coöperating at its inner end with the valve-member in said valve-casing in a manner similar to said first-mentioned tubular member, said second-mentioned tubular member having a recess in its outer end, and a sealing ring in said recess, a gage tube having one end fitted in the packing bushing in the outer end of said first-mentioned tubular member and its opposite end abutting the sealing ring in the outer end of said second-mentioned tubular member, and a packing gland on said gage tube engaging the adjacent end portion of said second-mentioned tubular member, said tubular member being screw-threaded externally in the region of the valve-casing, a jam nut on said screw-threaded portion of said tubular member in coöperative relation to the end of said valve-casing, and a releasable sealing ring interposed between said jam nut and the end of said valve-casing.

4. In a device of the class described, two opposed valve-casings, said valve-casings having alined openings in their meeting ends, valve-seats surrounding said openings, and opposed valve-seats, valve-members movable in said valve-casings between the first-mentioned and second-mentioned valve-seats thereof, said valve-members being arranged and adapted to coöperate with said first-mentioned valve-seats to shut off the flow from said valve-casings, and said valve-members and said second-mentioned valve-seats being relatively arranged and adapted so as to permit flow when in coöperative relation, tubular members fitted slidably in said alined openings of the valve-casings and projecting normally inward beyond the first-mentioned valve-seats thereof so as to hold said valve-members away from said valve-seats and having openings arranged and adapted to permit flow from said valve-casings when in such relation, means for effecting self-releasable seals between said tubular members and the ends of said valve-casings, a gage tube having sealed connections at its ends with the outer ends of said tubular members, and a device movable on one of said tubular members longitudinally thereof and coöperating with the end of the valve-casing for holding the coöperating parts in normal assembled relation and making the said seals effective.

In testimony whereof, I have hereunto set my hand.

JESSE E. KEPPEL.

Copies of this patent may be obtained for five cents each, by addressing the "Commissioner of Patents, Washington, D. C."